United States Patent [19] Bean et al.

[11] 4,268,235

[45] May 19, 1981

[54] APPARATUS FOR THE MANUFACTURE OF FIBROUS WEBS

[75] Inventors: William C. Bean, Larsen; Thomas M. Tao, Neenah, both of Wis.

[73] Assignee: American Can Company, Greenwich, Conn.

[21] Appl. No.: 105,897

[22] Filed: Dec. 21, 1979

[51] Int. Cl.³ .............................................. B29C 17/08

[52] U.S. Cl. .................................................... 425/83.1

[58] Field of Search ........................................ 425/83.1

[56] References Cited

U.S. PATENT DOCUMENTS

| | | | |
|---|---|---|---|
| 2,912,723 | 11/1959 | Roberts | 425/83.1 |
| 2,940,135 | 6/1960 | Heritage | 425/83.1 |
| 3,575,749 | 4/1971 | Kroger | 156/62.2 |
| 3,644,078 | 2/1972 | Tachibana et al. | 425/83.1 |
| 4,212,607 | 7/1980 | Miller | 425/83.1 |

*Primary Examiner*—Donald E. Czaja
*Assistant Examiner*—James R. Hall
*Attorney, Agent, or Firm*—Robert P. Auber; George P. Ziehmer; Harry W. Hargis, III

[57] ABSTRACT

Apparatus for the manufacture of a fibrous web comprises provision of a conduit having a plurality of outlets for discharging classified fibers onto a linearly movable planar section of an endless screen. The fibers pass through openings in the screen and land on an underlying planar section of a forming wire, in formation of the fibrous web, with the aid of an underlying vacuum box. Uniformity of fiber distribution is provided by parallel banks of brushes that engage the planar section of the endless screen and are rapidly oscillated in short, non-synchronous strokes transversely of the direction of screen movement.

9 Claims, 6 Drawing Figures

FIG. I

APPARATUS FOR THE MANUFACTURE OF FIBROUS WEBS

BACKGROUND OF THE INVENTION

This invention relates to improvements in the manufacture of fibrous webs.

In the manufacture of fibrous webs by the air-lay principle, care must be taken to ensure uniformity of distribution of fibers on a forming wire. Air-laid fibrous webs have a tendency to undesirable formation of streaks, flocks, and the like.

The following U.S. Patents are representative of prior-art efforts directed to overcoming the hereinabove discussed difficulties, and are believed material to the examination of this application:

U.S. Pat. No. 3,644,078 discloses a duct 108 for directing fibers onto an underlying moving distribution screen 109 for feed onto a lower forming wire 115 moving in the same direction. A transversely extending rotatable brush 110 contacts and scatters the fibers through screen 109.

U.S. Pat. No. 2,912,723 discloses a horizontally reciprocating fiber sifting screen 28 disposed above a forming wire screen 25.

U.S. Pat. No. 3,575,749 discloses rakes 34 in contact with a perforated band 28 moving in one direction for defibrating fibers and assisting the fibers therethrough and onto an underlying oppositely moving perforated forming band 21. A stationary screen 41 is positioned intermediate band 28 and forming band 21.

U.S. Pat. No. 2,940,135 discloses brushes 83 radially arranged on a rotor 80, and which urge fibers through an underlying stationary arcuate perforated head 72 onto a lower moving screen 10.

It is a general objective of this invention to provide improved apparatus for the manufacture of air laid fiber webs.

It is a further objective of the invention to provide improved apparatus for the manufacture of fiber webs so that the webs are substantially devoid of streaks, flocks, and the like.

It is another objective of the invention to provide improved means for distributing fibrous material onto a forming wire of apparatus for the manufacture of fiber webs.

SUMMARY OF THE INVENTION

In achievement of the foregoing as well as other objectives and advantages, the invention contemplates improvements in an apparatus for the manufacture of fiber webs, comprising, in its apparatus aspect, delivery means for dry fibers, an endless screen including a planar section linearly movable beneath said delivery means and effective to permit passage of delivered fibers therethrough onto a forming wire provided therebeneath and also linearly movable in the direction of movement of said planar section of said screen, vacuum box means disposed beneath said forming wire, and a plurality of banks of elongate brushes in parallel array, each extending transversely of the direction of movement of said screen and said forming wire, and operative to oscillate longitudinally uniformly to distribute said fibers upon passage through said screen onto said forming wire.

The manner in which the foregoing as well as other objectives and advantages of the invention may best be achieved will be more fully understood from a consideration of the following description, taken in light of the accompanying drawing.

DESCRIPTION OF THE PREFERRED EMBODIMENT

Figure 1:
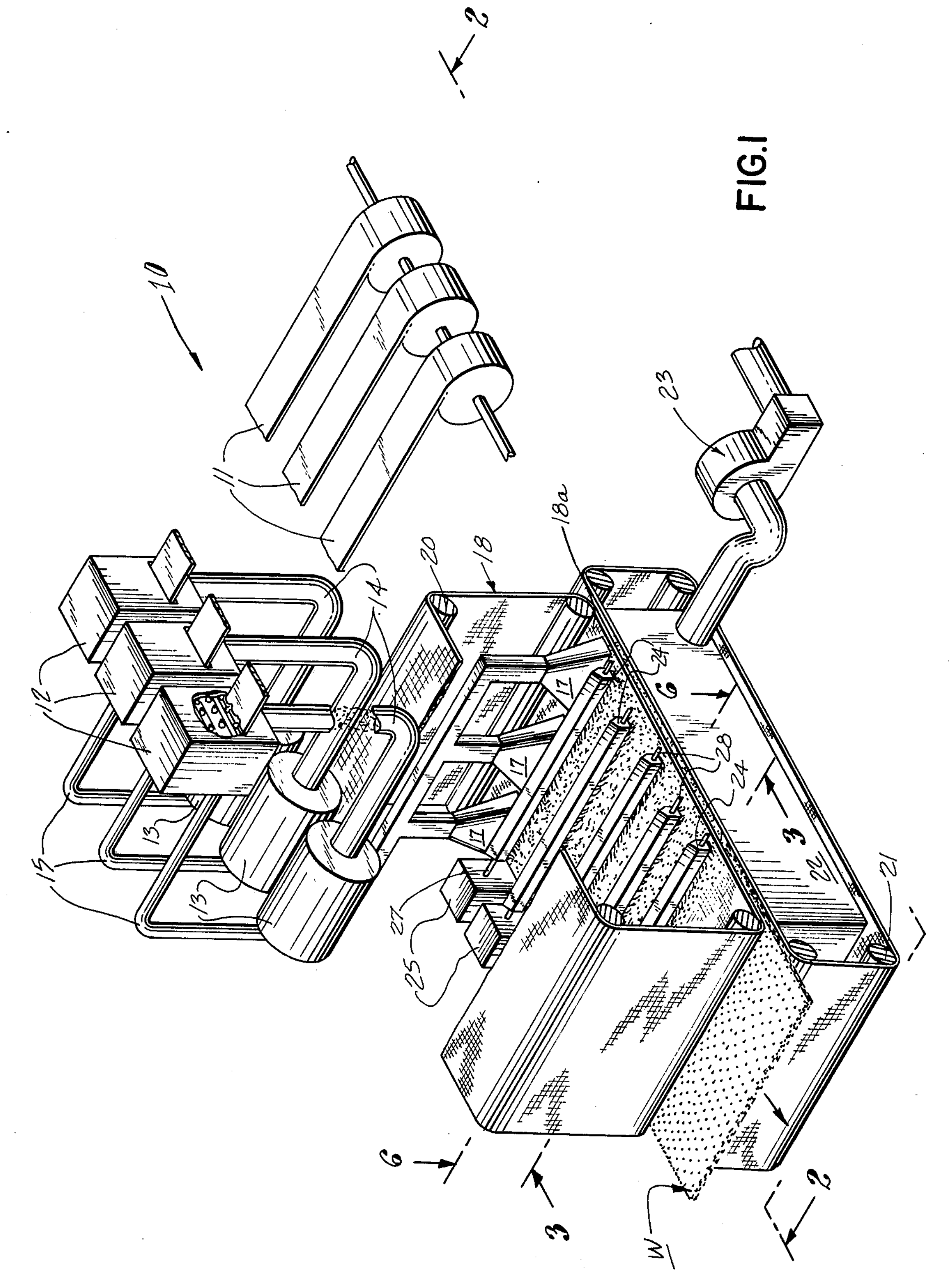
FIG. 1 is a diagrammatic perspective view, with parts fragmented, of fibrous web forming apparatus embodying the invention.
Figure 2:
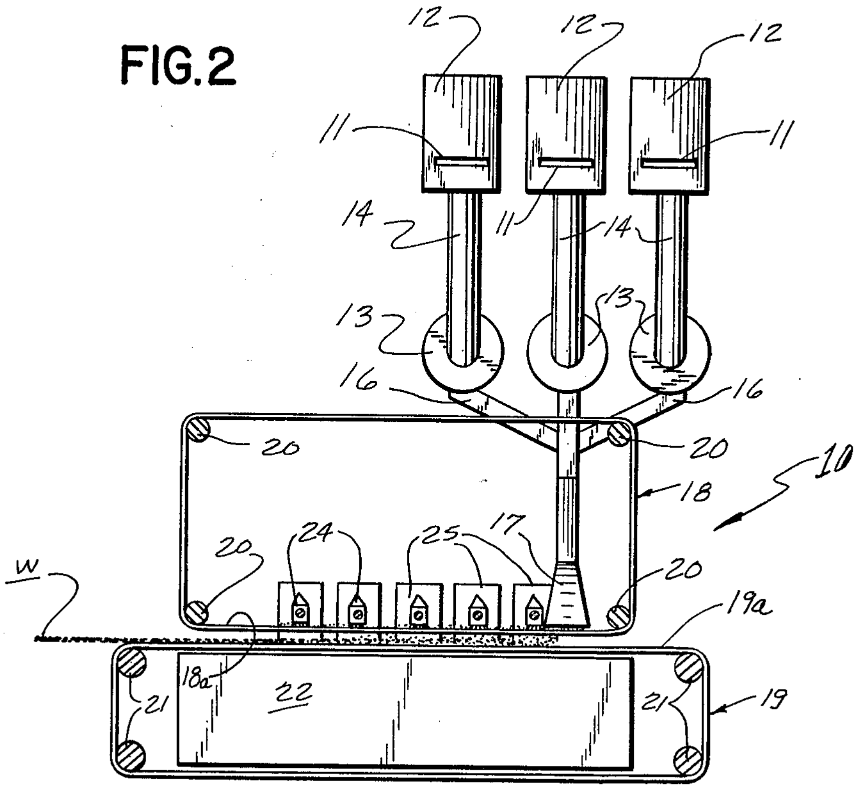
FIG. 2 is a sectional view taken generally along the line 2—2 in FIG. 1, and looking in the direction of arrows applied thereto.
Figure 3:
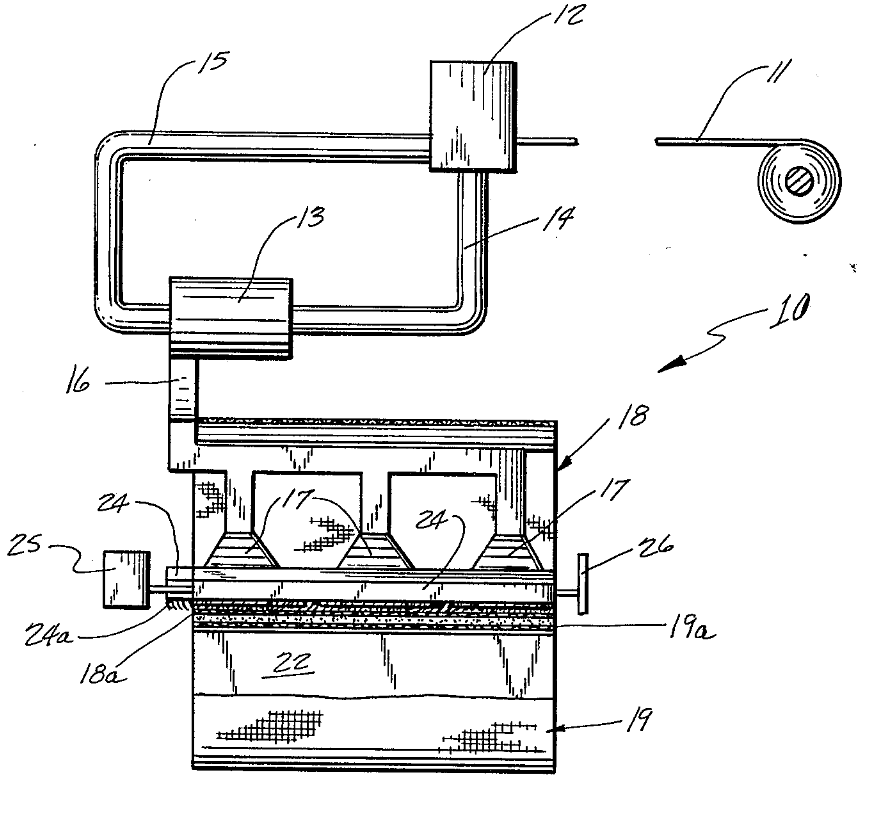
FIG. 3 is a sectional view taken generally along the line 3—3 in FIG. 1, and looking in the direction of arrows applied thereto.

With more detailed reference to the drawing, there is seen in FIGS. 1 to 3 apparatus 10 for forming a web of fibrous material. Rolls of pulp 11 are fed to individual fiberizers 12 for delivery to fiber classifiers 13 through individual ducts 14. Return ducts 15 (FIGS. 1 and 3 only) connect the outlets of classifiers 13 with fiberizers to deliver oversized flocks for further reduction. Fibers of proper size are delivered through ducts 16, are seen to advantage in FIGS. 2 and 3, to flared delivery heads 17 having outlets for discharging classified fibers onto an underlying planar section **18*a* of an endless screen 18. Construction and arrangement of the screen 18 is such that the fibers pass therethrough and land on an underlying planar section 19*a* of an endless forming wire 19 in formation of a fibrous web designated generally by the letter W. Screen 18 and forming wire 19 are mounted for linear movements on respective sets of rollers 20 and 21, so that sections 18*a* and 19*a* are unidirectionally movable, preferably, but not necessarily, at the same speeds. A vacuum box 22 is disposed beneath forming wire section 19*a*, and is operative through vacuum source 23 (FIG. 1**) connected thereto to create an air pressure differential sufficient to draw discharged fibers down onto the forming wire.

Figure 4:
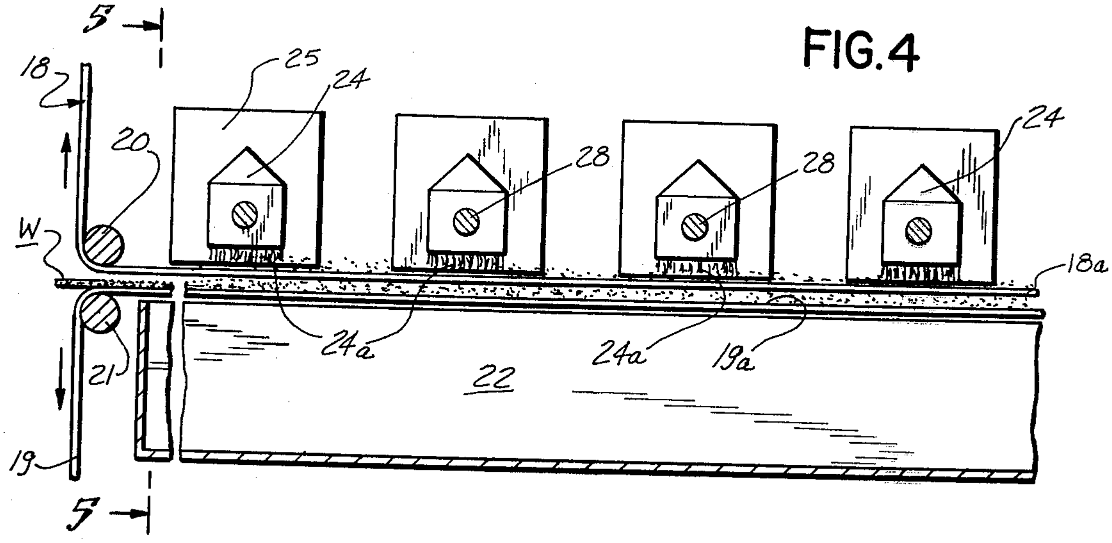
FIG. 4 is an enlarged showing of a portion of FIG. 2.
Figure 5:
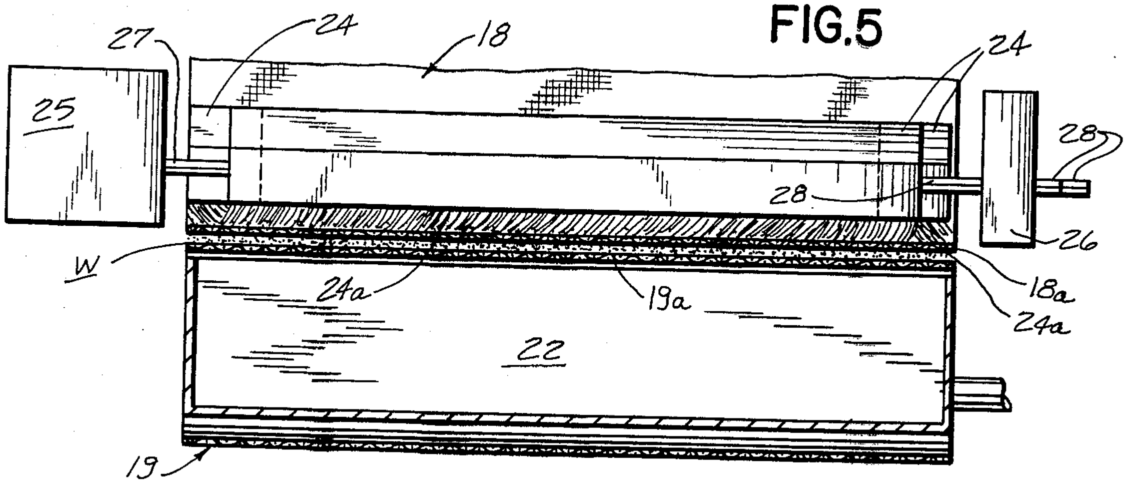
FIG. 5 is a sectional view taken along the line 5—5 in FIG. 1, looking in the direction of arrows applied thereto.
Figure 6:
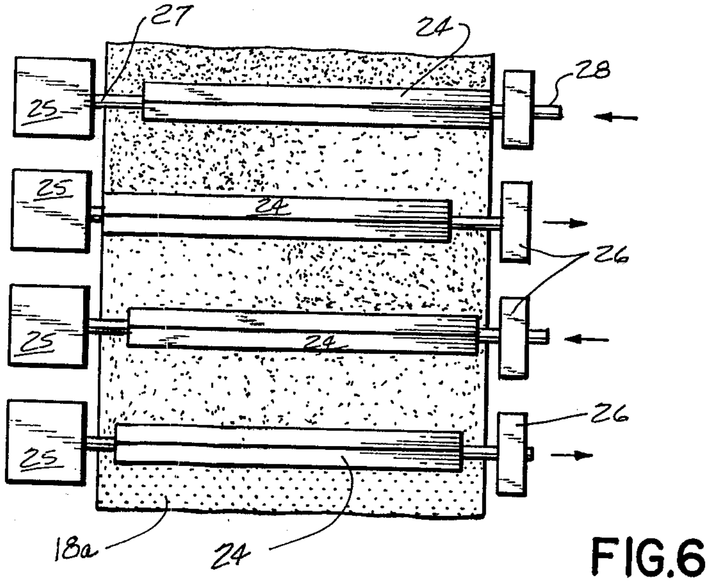
FIG. 6 is a sectional view, taken along the line 6—6 in FIG. 1, looking in the direction of arrows applied thereto.

In especial accordance with the invention, and with reference also to FIGS. 4, 5, and 6, a plurality of elongate banks 24 of brushes extend in substantially parallel array transversely of the direction of movement of screen 18. Brush banks 24 are so disposed above screen 18 that tips of the bristles **24*a* just touch the screen. Moreover, the banks 24 are mounted for longitudinal movements, in short, non-synchronous oscillating strokes, as is indicated by directional arrows applied thereto in FIG. 6. Means for achieving oscillatious of the brush banks conveniently may comprise supports shown somewhat diagrammatically at 25 and 26 (FIGS. 3, 5 and 6) at opposite ends of the banks 24, and slidably supporting respective projecting portions 27 and 28 of the banks. The portions 27 at one end are linked to known suitable individual oscillatable drive means within supports 25** and operative to provide longitudinal, non-synchronous oscillatious of the brush banks.

For air laying the wood fibers, it has been found that a screen of No. 6 mesh size readily passes the fibers and imparts a directional speed thereto corresponding essentially to the speed of movment of forming wire 19. Further to operation of the apparatus, delivery of the fibers from heads 17 is characterized by coarse transverse uniformity. A portion of the delivered fibers fall through moving screen 18 while others are temporarily carried horizontally by the screen until they are engaged by bristles 24*a* of an oscillating brush bank 24. The moving brush bank 24 imparts a transverse displacement to these fibers in the cross machine direction. Fibers not falling through the screen 18 are moved thereby to the next successive bank 24, and so on. By virtue of the oscillating movement of the brush banks, uniformity of fiber distribution is ensured in the cross machine direction of web W. Screen 18 has a substantially larger mesh size than that of the forming wire so that screen 18 will not trap depositions of fibers. Moreover, the oscillating brush banks 24 constantly clean screen 18, and, in achievement of their function, the brush banks need only be placed near the wire 19, whether or not they are in or out of contact therewith being a matter of choice. While in the disclosed embodiment the screen 18 and the forming wire 19 move at substantially the same speed, it will be understood that they may be caused to move at different speeds.

Advantageously, and unlike teachings of the prior art, it will be appreciated that the hereinabove described apparatus embodying our invention is so constructed and arranged as to segregate the fiber classifying function from the air forming function, thereby achieving improved performance. Segregation of these functions affords choice of more effective, larger size and more powerful classifiers for the delivery heads, without the usual detrimental effects of prior art classifiers, such as agitator-induced disturbances and partially blind areas that contribute to uneven web formation.

It will be appreciated also that by virtue of the absence of rotating brushes and of rotating agitator blades in the distributing zone characteristic of prior-art apparatuses, aerodynamic disturbances above a newly formed fiber web W advantageously is avoided, further ensuring improved web quality.

While a preferred embodiment of the invention has been described, it will be understood that such other modifications may be made as are contemplated by the scope of the appended claims.

We claim:

1. Apparatus for manufacturing fiber webs, comprising: delivery means for dry fibers; an endless screen including a planar section linearly movable beneath said delivery means and effective to permit passage of fibers therethrough onto a forming wire provided therebeneath, and also linearly movable in the direction of movement of said planar section of said screen; vacuum box means disposed beneath said forming wire; and a plurality of banks of elongate brushes in parallel array, each extending transversely of the direction of movement of said screen and said forming wire and operative to oscillate longitudinally, thereby to engage and uniformly distribute said fibers as they pass through said screen onto said forming wire.

2. Apparatus of claim 1, wherein said brushes engage said screen.

3. Apparatus of claim 1 wherein said brushes are spaced from said screen.

4. Apparatus of claim 1, wherein said banks of brushes are operative to oscillate non-synchronously.

5. Apparatus of claims 2 or 3, wherein said banks of brushes are operative to oscillate non-synchronously.

6. Apparatus of claim 1, wherein said planar sections of said screen and said forming wire are movable in the same direction at substantially the same speeds.

7. Apparatus of claim 2 or 3 wherein said planar section of said screen and said forming wire are movable in the same direction at substantially the same speeds.

8. Apparatus of claim 1, wherein said planar sections of said screen and said forming wire are movable in the same direction at different speeds relative to one another.

9. Apparatus of claims 1 or 2, wherein said planar sections of said screen and said forming wire are movable in the same direction at different speeds relative to one another.

* * * * *